United States Patent
Bagaric et al.

(10) Patent No.: US 11,047,947 B2
(45) Date of Patent: Jun. 29, 2021

(54) STANDING WAVE CANCELLATION WIRELESS TRANSMITTER, RECEIVER, SYSTEM AND RESPECTIVE METHOD

(71) Applicant: INSTITUTO POLITÉCNICO DE LEIRIA, Leiria (PT)

(72) Inventors: Josip Bagaric, Leiria (PT); Joäo Da Silva Pereira, Carvide (PT); Silvio Priem Mendes, Leiria (PT)

(73) Assignee: INSTITUTO POLITÉCNICO DE LEIRIA, Leiria (PT)

( * ) Notice: Subject to any disclaimer, the term of this patent is extended or adjusted under 35 U.S.C. 154(b) by 249 days.

(21) Appl. No.: 16/075,674

(22) PCT Filed: Feb. 3, 2017

(86) PCT No.: PCT/IB2017/050608
§ 371 (c)(1),
(2) Date: Aug. 6, 2018

(87) PCT Pub. No.: WO2017/134625
PCT Pub. Date: Aug. 10, 2017

(65) Prior Publication Data
US 2019/0056474 A1    Feb. 21, 2019

(30) Foreign Application Priority Data
Feb. 4, 2016 (PT) .......................... 109137

(51) Int. Cl.
*G01S 5/02* (2010.01)
*G01S 1/04* (2006.01)
*G01S 5/18* (2006.01)

(52) U.S. Cl.
CPC ............ *G01S 5/0215* (2013.01); *G01S 1/042* (2013.01); *G01S 1/0423* (2019.08); *G01S 5/0226* (2013.01); *G01S 5/18* (2013.01)

(58) Field of Classification Search
CPC ........ G03F 1/26; H01Q 21/08; H01Q 21/061; H01Q 11/02; H01Q 25/02; H01Q 1/242;
(Continued)

(56) References Cited

U.S. PATENT DOCUMENTS 6,597,926 B1 *  7/2003  Rek .......................... H01Q 3/24
                                               455/277.1
8,718,122 B2 *  5/2014  Griesing ............... H04W 24/00
                                               375/224
(Continued)

FOREIGN PATENT DOCUMENTS

PT         106755        7/2014

OTHER PUBLICATIONS

Juan Lei, Guang Fu, Lin Yang and De-Min Fu "Wide Band Linear Printed Antenna Array With Low Sidelobe Cosecant Square-Shaped Beam Pattern" Progress in Electromagnetics Research C, 2010. vol. 15,pp. 233-241.

*Primary Examiner* — Olumide Ajibade Akonai
(74) *Attorney, Agent, or Firm* — Mark M. Friedman

(57) ABSTRACT

The present invention is enclosed in the area of wireless communication systems, generally towards the problem of multipath interference, and specifically towards mitigating the effect of standing wave in indoor positioning systems. The present invention includes a standing wave cancellation wireless transmitter configured to, for each signal with wavelength λ to be transmitted, transmit a first wave with wavelength λ and a second wave with wavelength λ and a shift equal to half the wavelength λ.

It is also part of present invention a standing wave cancellation wireless receiver configured to perform the average of a first wave with wavelength λ and a second wave with wavelength λ and a shift equal to half the wavelength λ, creating a single received signal and a system comprising at least one of said wireless transmitters and at least one of said wireless receivers and a method implemented by the said transmitter and receiver.

5 Claims, 2 Drawing Sheets

(58) Field of Classification Search
CPC .......... H01Q 3/24; H01Q 1/243; H01Q 25/00;
H01Q 3/38; H01Q 3/36; H01Q 3/22;
H01Q 3/30; G01S 13/0209; G01S 13/28;
G01S 7/4017; G01S 7/4021; G01S
5/0215; G01S 1/0423; G01S 5/0226;
G01S 1/042; G01S 5/18; H01P 1/182;
H01P 1/184; H01P 1/213; H01P 1/127;
H01P 1/18; H04B 1/48; H04B 1/3877;
H04B 1/04; H04B 7/00; H04B 1/006;
H04B 17/12; H04B 1/02; H04B 7/0617;
H04B 1/44; H04B 1/18
See application file for complete search history.

(56) References Cited

U.S. PATENT DOCUMENTS

| | | | |
|---|---|---|---|
| 2006/0158174 A1* | 7/2006 | Marzalek | G01R 31/2822 |
| | | | 324/76.19 |
| 2007/0213947 A1* | 9/2007 | Jaklitsch | G01R 27/32 |
| | | | 702/66 |
| 2007/0216420 A1 | 9/2007 | Jaklitsch | |
| 2008/0079640 A1* | 4/2008 | Yang | H01Q 21/10 |
| | | | 343/702 |
| 2011/0273244 A1* | 11/2011 | Iluz | H01P 1/184 |
| | | | 333/161 |
| 2012/0280794 A1* | 11/2012 | Parrault | H04L 27/2046 |
| | | | 340/10.1 |
| 2015/0177371 A1* | 6/2015 | Abbasi | G01S 7/4008 |
| | | | 342/174 |

* cited by examiner

STANDING WAVE CANCELLATION WIRELESS TRANSMITTER, RECEIVER, SYSTEM AND RESPECTIVE METHOD

FIELD OF THE INVENTION

This invention is enclosed in the area of wireless communication systems, generally directed towards the problem of multipath interference, and specifically towards mitigating the effect of the standing wave in indoor positioning systems. It relates to the impact of standing waves in wireless communication and proposes a solution to reduce the negative impact of standing waves when wireless communication is used in indoor positioning systems (IPS).

PRIOR ART

A common occurrence in the field of wireless communication is the standing wave. In environments that contain many obstacles, such as closed spaces, the wave that is being sent from the transmitter to the receiver propagates through space and gets reflected from different kinds of surfaces. These reflections cause the receiving end to receive multiple instances of the same wave, some of them arriving directly, while others arriving after being reflected from a certain object. This occurrence is commonly called multipath interference (MPI), and represents a common issue in indoor positioning systems that use wireless technology.

The MPI has another side-effect, which is called the standing wave. When a wave gets reflected from a surface, it generates another wave that propagates back in the opposite direction. If one puts a receiver somewhere between the transmitter and the reflective surface, detecting the strength of the signal would vary on the position in which the receiver is placed because of the standing wave effect. Certain positions, particularly those that are half wave length apart, would show no oscillations in the signal strength when measured multiple times. These points along the medium are called nodes (N). Some other points along the medium would yield different results, showing high oscillations in signal strength. The points that contain the highest amount of oscillations are called the antinodes (AN).

In order to achieve accurate and consistent indoor positioning estimation using signal strength, inside closed spaces, mitigating the effect of the standing wave is one of the problems that needs to be addressed. Currently, a technical solution to this problem does not exist, and this patent introduces a way to solve the problem of the standing wave when wireless communication is used in indoor positioning systems.

The Portuguese patent number 106755 (J. Pereira, H. A. Silva, Codificador e descodificador eletrónico de sinais ortogonais e perfeitos) has been presented to cancel multipath interferences through a CODEC of orthogonal perfect DFT of Golay codes (OPDG). However this CODEC does not address the standing wave issue. The OPDG autocorrelation peak follows the standing wave fluctuation.

Solved Technical Problems

As detailed above, the present invention is directed into the problem of multipath interference, more specifically to standing wave cancellation.

Another problem is the displacement speed of the standing wave. When too slow, real-time measurements cannot be achieved, and as a result such a system is not usable in a real-world application.

The present invention proposes to correct the slow motion standing wave problem. This is achieved by devices and methods that swiftly alternate a primary standing wave with a second one that is generated in opposite phase.

Therefore, this invention provides a solution to a well-known problem in wireless communication indoor scenarios, where multipath interferences may generate standing waves between reflective obstacles. These are a common issue in indoor scenarios that in turn makes such an approach unfeasible when considering indoor positioning system accuracy. Until now this problem remains unsolved as no solution has ever been presented.

SUMMARY OF THE INVENTION

It is an object of the present invention a standing wave cancellation wireless transmitter (1) configured to, for each signal with wavelength $\lambda$ to be transmitted, transmit a first wave with wavelength $\lambda$ and transmit a second wave with wavelength $\lambda$ and a phase shift equal to half the wavelength $\lambda$.

Referring to FIG. 1, it depicts a graph displaying the effect of the standing wave on the indoor positioning system estimation. The graph also displays the standing wave effect mitigation used in the standing wave cancellation wireless transmitter (1), standing wave cancellation wireless receiver and methods of the present invention. The standing wave effect has a major impact on the accuracy of location estimation in the radio wave mechanism, due to the constant change in amplitude of the wave that affects signal strength readings, and thus, location accuracy. To mitigate the effect of the standing waves, hardware-based techniques are implemented to generate two different standing waves.

The first standing wave is a wave with a full wavelength of $\lambda$. The second standing wave also has a wavelength of $\lambda$, but starts with a phase shift of $\lambda/2$. The curve gained from summing up the two waves proves to be better for usage, for example, in location estimation scenarios when considering that the X-axis is the distance and the Y-axis is the power of the signal received. It may be used both in radio frequency waves and ultrasonic waves.

It is also object of the present invention a standing wave cancellation wireless receiver which contains electronic means to perform the average of a first wave with wavelength $\lambda$ and a second wave with wavelength $\lambda$ and a phase shift equal to half the wavelength $\lambda$, configured to create single received signal.

Also as said for the standing wave cancellation wireless transmitter (1), this receiver enables the mitigation of the effect of the standing waves, as seen in the graph of FIG. 1, by combining said two received waves.

Also, the present invention includes a standing wave cancellation wireless system which comprises at least a standing wave cancellation wireless transmitter (1) as previously defined and at least a standing wave cancellation wireless receiver as previously presented.

Additionally, it is also an object of the present invention a method for the cancellation of standing wave in wireless communications implemented by said system, which comprises a transmission stage and a receiving stage, wherein:
  in the transmission stage a standing wave cancellation wireless transmitter (1), based in a single signal, transmits a first wave with wavelength $\lambda$ and a second wave with wavelength $\lambda$ and a phase shift equal to half the wavelength $\lambda$ and
  in the receiving stage, a standing wave cancellation wireless receiver containing electronic means, for a received first wave with wavelength and a received second wave with wavelength λ and a phase shift equal to half the wavelength λ, calculates their average on power or amplitude through the electronic means, obtaining a single signal.

DESCRIPTION OF DRAWINGS

The features of the invention believed to be innovative are set forth with particularity in the claims. The invention itself, however, may be best understood by reference to the following detailed description of the invention, which describes exemplary embodiments of the invention, taken in conjunction with the accompanying drawings, in which:

DETAILED DESCRIPTION OF THE INVENTION

The most general configurations of the present invention are defined in the Summary of the invention. These configurations may be further detailed. The standing wave cancellation wireless transmitter (1) may further comprise a signal generator (2) suitable for creating a signal with wavelength λ, an output (5) and a relay switch (3), connected so that a relay switch (3) alternatively connects the signal generator (2) through a first path generating a first wave and through a second path to the output (5), wherein the second path is connected to means for delivering the signal shifted in half the wavelength λ (4), creating the second wave. It consists of a possible implementation of the previously defined transmitter, delivering two waves, in which the second wave is shifted in half the wavelength.

When the relay switch (3) is in the initial position, the signal generator (2) transmits a first wave directly to the output (5). The signal generator (2) may also control the relay switch (3), so when it switches the relay switch (3) to the alternate position, the signal comes from the means for delivering the signal shifted in half the wavelength λ (4), and then to the output (5). Therefore, the second wave will have a half wavelength delay in relation to the first wave.

The transmitter of the present invention may implement radio or ultrasound communications.

Figure 1:
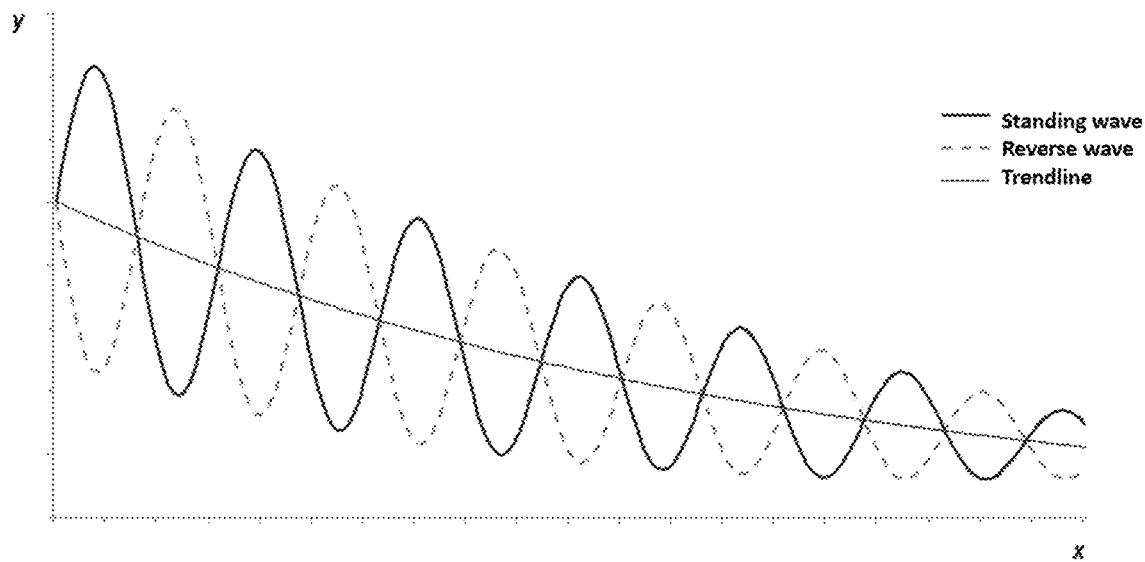
FIG. 1—a graph displaying the effect of the standing wave on the indoor positioning system estimation, along with the effect of the mitigation used within the system.
Figure 2:
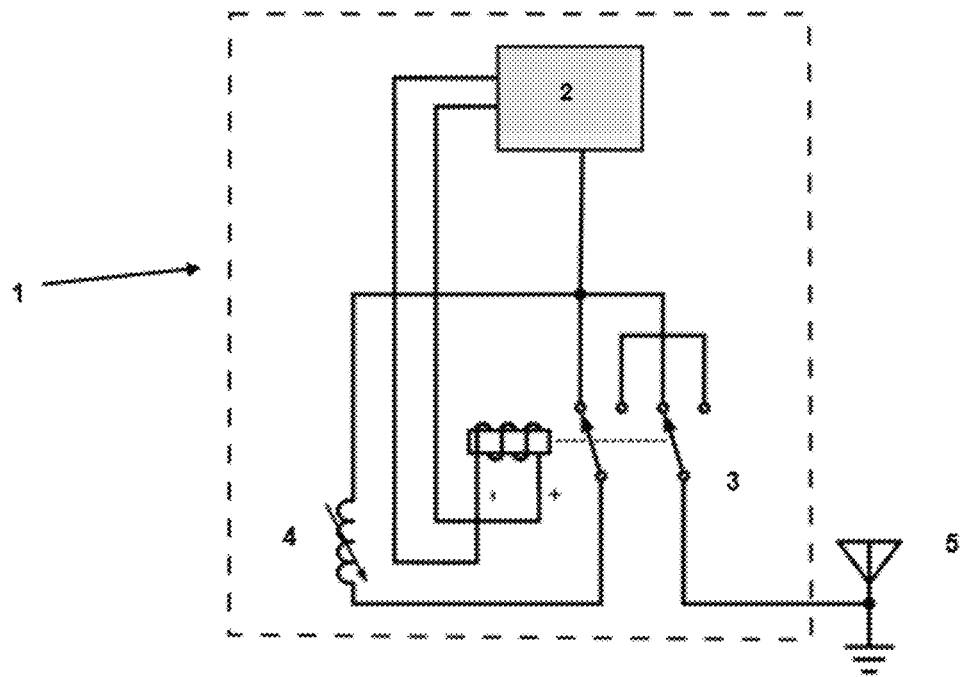
FIG. 2—a schematic view of the electric circuit of a wireless transmitter (1) according to the present invention, used to mitigate the standing wave effect in radio wave transmission, representing means for delivering the signal shifted in half the wavelength λ (4) as a coaxial cable, a relay switch (3) as a double pole double throw switch, the output (5) as an antenna and the signal generator (2).

In an embodiment specifically for radio communications, said signal generator (2) is a radio signal generator, the relay switch (3) is a Double Pole Double Throw (DPDT) relay switch (3), the output (5) an antenna and the means for delivering the signal shifted in half the wavelength λ (4) consist of a coaxial cable. The half wavelength delay generated by the correct length of the coaxial cable (see FIG. 2) generates the second radio wave. A radio wireless transmitter (1) according to the present invention uses the DPDT relay switch (3) to emit two radio waves—possibly in time-division multiplexing-, thus mitigating the effect of the standing wave by summing up the two waves before processing them. The dashed line in FIG. 2 surrounding all of the elements besides the antenna represents a metallic enclosure that serves as a reflector and isolator of the radio signal contained inside the electric circuit.

In this case, when the DPDT relay switch (3) is in the initial position, the radio signal generator (2) transmits a first wave directly to the output (5) using the shortest path possible. The signal generator (2) may also control the DPDT relay switch (3), so when it switches the relay switch (3) to the alternate position, the signal passes through a coaxial cable of a certain length, and then to the output (5). This causes the half wavelength delay generated by the correct length of the coaxial cable and generates the second wave. The dashed line surrounding all of the elements besides the antenna represents a metallic enclosure that serves as a reflector and isolator of the radio signal contained inside the electric circuit.

Figure 3:
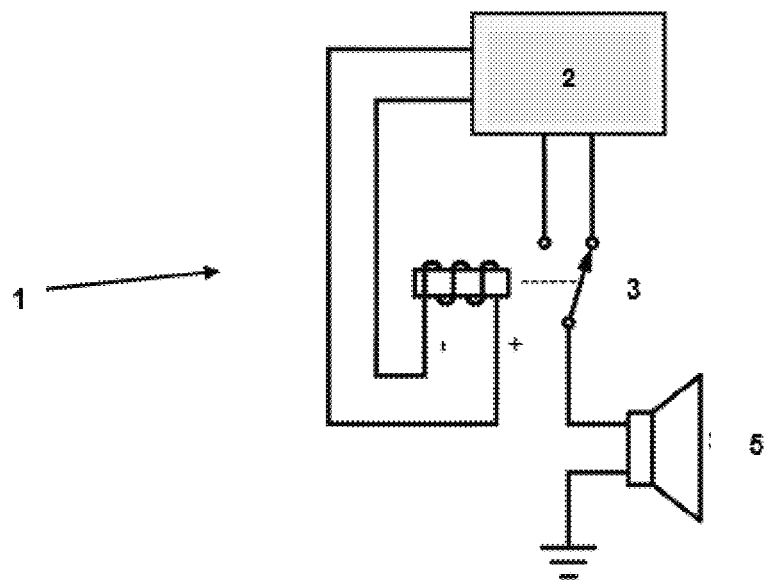
FIG. 3—a schematic view of the electric circuit of a wireless transmitter (1) according to the present invention, used to mitigate the standing wave effect in ultrasound transmission, representing a relay switch (3) as a single pole double throw switch, the output (5) as a speaker and the signal generator (2).
Figure 4:
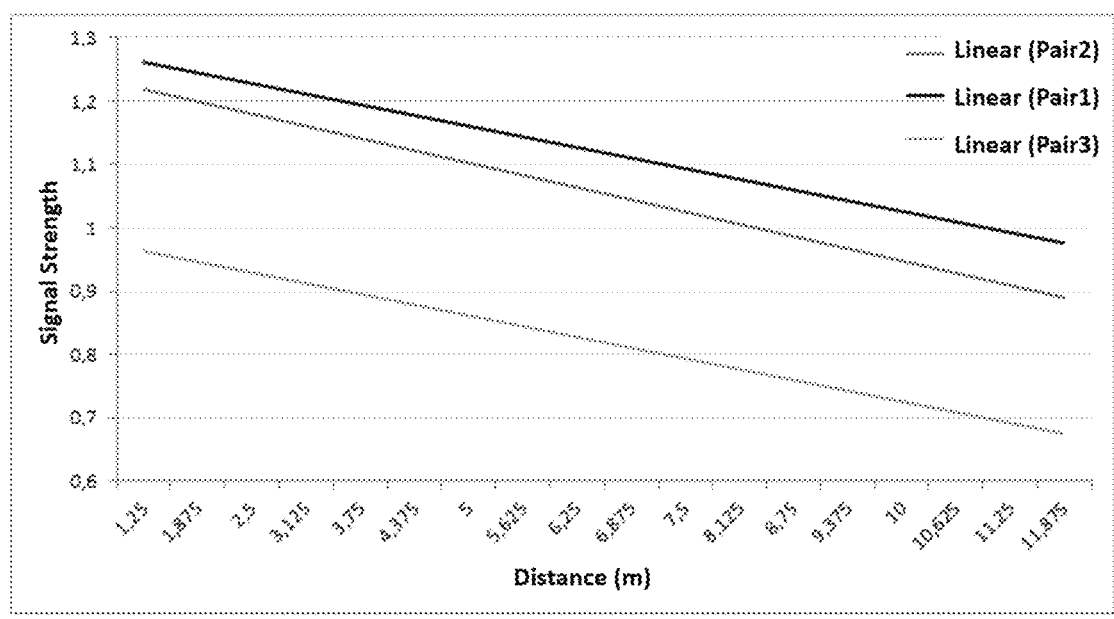
FIG. 4—a graph displaying linear estimations of signal strength trend lines gained from measuring signals from different pairs of transmitters after the standing wave cancelation process, in a range of approximately 12 meters. It is gained from measuring signals from different pairs of transmitters. This graph contains a number of lines equal to the number of emitter pairs inside an example scenario (not limited to three pairs).

Specifically for ultrasound communications, the relay switch (3) is a Single Pole Double Throw (SPDT) relay switch (3), the output (5) a speaker and the signal generator (2) is an ultrasonic signal generator with two outputs: i) a first output which outputs an ultrasound wave with wave wavelength λ and ii) a second output which outputs a second wave with wavelength λ and a phase shift equal to half the wavelength λ, wherein the second output consists of the means for delivering the signal shifted in half the wavelength λ (4). Similarly to what was referred to radio communications and considering FIG. 3, which displays a hardware-based solution that implements the standing wave mitigation for ultrasound waves, the ultrasound transmitter is connected to a SPDT relay switch (3), which enables the signal generator (2) to switch between two audio outputs. One of the outputs is a regular λ wavelength ultrasound wave. The other audio output (5) outputs the same ultrasound wave, but with a phase shift for λ/2.

In a preferred embodiment relative to both the radio and ultrasound implementations, the transmitter of the present invention is further configured to implement time division multiplexing which, as said, mitigates the effect of the standing wave by summing up the two waves before processing them.

Considering the wireless receiver of the present invention, said average performed to the first and second received waves, it is the average of the amplitude or power of said first and second waves.

Also, the wireless receiver of the present invention may implement radio or ultrasound communications.

Specifically for radio communications, it comprises an antenna and radio wave transducer means.

Specifically for ultrasound communications, it comprises a microphone and ultrasound transducer means.

The system defined in Summary of the invention may include a wireless transmitter (1) and a wireless receiver as defined in any of previously defined embodiments.

Also, the method defined in Summary of the invention may also be implemented by this system, including its previously referred embodiment. This method may still be further detailed in that it comprises the following steps:

a signal with wavelength λ is generated in a wave generator;

said signal is inserted into a first path and into a second path by means of a relay switch (3);

the signal transmitted through the second path is shifted in half the wavelength λ;

both the signal from the first path and the signal from the second path are wirelessly transmitted through the output (5).

Also, in any of the embodiments of said method, the signal may be a radio signal or an ultrasound signal.

The present invention also includes the use of the previously referred transmitter, receiver or system, in any of the detailed embodiments, in positioning systems, preferably indoor positioning systems.

The several embodiments described are combinable.

Each of the claims of the following set of claims defines specific embodiments.

The invention claimed is:

1. A standing wave cancellation wireless transmitter, the wireless transmitter being configured to, for each signal with wavelength to be transmitted, transmit a first wave with wavelength and transmit a second wave with wavelength and a phase shift equal to half the wavelength and wherein the wireless transmitter comprises:
  (a) a signal generator suitable for creating a signal with wavelength,
  (b) an output, and
  (c) a relay switch, configured so that the relay switch:
    (A) alternatively connects the signal generator through a first path generating a first wave and through a second path to the output, and
    (B) wherein the second path is connected to a means for delivering the signal shifted in half the wavelength, creating the second wave.

2. The standing wave cancellation wireless transmitter according to claim 1 characterized in that the relay switch is a single pole double throw (SPDT) relay switch, the output a speaker and the signal generator is an ultrasonic signal generator with two outputs:
  i) a first output which outputs an ultrasound wave with wave wavelength and
  ii) a second output which outputs a second wave with wavelength and a phase shift equal to half the wavelength,
wherein the second output consists of the means for delivering the signal shifted in half the wavelength.

3. Standing wave cancellation wireless transmitter according to claim 1 characterized in that the relay switch is a Double Pole Double Throw (DPDT) relay switch, the output an antenna, the signal generator is a radio signal generator and the means for delivering the signal shifted in half the wavelength consist of a coaxial cable.

4. Standing wave cancellation wireless transmitter according to claim 1 characterized in that it is further configured to implement time division multiplexing.

5. Use of the transmitter of claim 1 in positioning systems, preferably indoor positioning systems.

* * * * *